United States Patent [19]

Hakoyama

[11] 4,287,521
[45] Sep. 1, 1981

[54] CRT HARD COPY APPARATUS WITH MULTI-DIRECTIONAL SAMPLING AND PRINTING

[75] Inventor: Akiyoshi Hakoyama, Hitachi, Japan

[73] Assignee: Hitachi, Ltd., Tokyo, Japan

[21] Appl. No.: 132,649

[22] Filed: Mar. 21, 1980

[30] Foreign Application Priority Data

Mar. 24, 1979 [JP] Japan .................................. 54-33807

[51] Int. Cl.³ ...................... G01D 9/00; G01D 15/10; H05B 3/00
[52] U.S. Cl. ................................ 346/35; 346/76 PH; 219/216
[58] Field of Search .................. 346/35, 76 R, 76 PH; 219/216

[56] References Cited

U.S. PATENT DOCUMENTS

| | | | |
|---|---|---|---|
| 4,070,680 | 1/1978 | Shelley | 346/76 PH |
| 4,158,203 | 6/1979 | Johnson, Jr. et al. | 346/35 |

Primary Examiner—George H. Miller, Jr.
Attorney, Agent, or Firm—Craig and Antonelli

[57] ABSTRACT

A CRT hard copy apparatus for sampling a picture signal from a CRT display and for recording the sampled signal on a recording paper. In order to obtain a suitable CRT hard copy for both kinds of CRT display in which the number of characters per screen is large and small, the CRT hard copy apparatus is constructed to include a first sampling means for sampling in the horizontal scanning direction a video signal on a CRT display of small number of characters per screen, and a second sampling means for sampling in the vertical direction to the horizontal scanning lines a video signal on a CRT display of large number of characters per screen. In addition, a switching means is provided to actuate only the first sampling means upon horizontal scanning and both the first and second sampling means upon vertical scanning.

8 Claims, 11 Drawing Figures

CRT HARD COPY APPARATUS WITH MULTI-DIRECTIONAL SAMPLING AND PRINTING

The present invention relates to a CRT hard copy apparatus of the type in which a picture signal from a CRT display device is sampled and recorded on a recording paper as a dot matrix.

As a CRT hard copy apparatus of this type there is known a copy apparatus with a heat sensitive type head which has a number of heat generating resistors arranged in a single row, wherein a picture signal from a CRT display is sampled one horizontal line by one horizontal line at each field, temporarily stored in a buffer memory, and then read and recorded at a speed suitable for recording, and wherein each time the recording of one horizontal line has been finished, the recording paper is shifted by the pitch of the scanning lines, thus taking thereon a hard copy of the picture presented on the CRT display. Such an apparatus has been disclosed in, for example, Japanese Patent Laid Open Publication No. 38918/76.

While, in this CRT hard copy apparatus, the line sampled at each field generally corresponds to the horizontal scanning direction on the CRT. However, there is a possibility of sampling the picture on the CRT in the vertical direction.

On the other hand, the CRT display device has a possibility of using a great variety of picture screens, for example, the number of characters displayed on the screen is in a wide range of 100 to 4000 characters/screen. Therefore, a single CRT hard copy apparatus has a limitation on its application to the CRT display. If, for example, a hard copy of 4000 characters per screen is taken, the size of the recording paper used must be relatively large, for example, A4 size. When the hard copy apparatus is used for a small type of CRT display of several hundred characters/screen, the A4 size paper is too large, and in this case a relatively small size, for example, A5 size is suitable. Thus, it will be understood that use of a hard copy apparatus suited for the number of characters per screen is satisfactory from the viewpoint of paper size and cost of the hard copy apparatus.

Accordingly, it is an object of the invention to provide a CRT hard copy apparatus capable of recording on a recording paper of the size selected in accordance with the number of characters per screen or resolution of the CRT display used.

In order to achieve this object, the present invention considers the fact that the CRT display screen is normally long in the horizontal scanning direction and short in the vertical direction and thus the number of dots in the vertical direction corresponds to $\frac{1}{2}$ to $\frac{1}{3}$ of the dot number in the horizontal direction.

The CRT hard copy apparatus of the present invention in which a picture signal from the CRT display is sampled and recorded on a recording paper, comprises a first sampling means for sampling the picture signal in the horizontal scanning line direction, a second sampling means for sampling the picture signal in the vertical direction perpendicular to the horizontal scanning line, and a switching means for selecting either of the first and second sampling means. When the hard copy apparatus of the invention is used with a high-resolution CRT display having a resolution higher than, for example, 1500 characters/screen or more, the second sampling means is operated by the switch device to perform recording on a relatively large recording paper (for example, A4 size). When the hard copy apparatus of the invention is used with a small-type CRT display capable of displaying 1500 characters/screen or below, the first sampling means is operated by the switch means to perform recording on a relatively small recording paper (for example, A5 size).

Other objects, features and advantages of the present invention will be readily apparent from the following descriptions taken in conjunction with the accompanying drawings, in which.

One embodiment of a CRT display apparatus of the invention will now be described in detail with reference to the drawings in which like elements are referred to by the same reference numerals.

Figure 1:
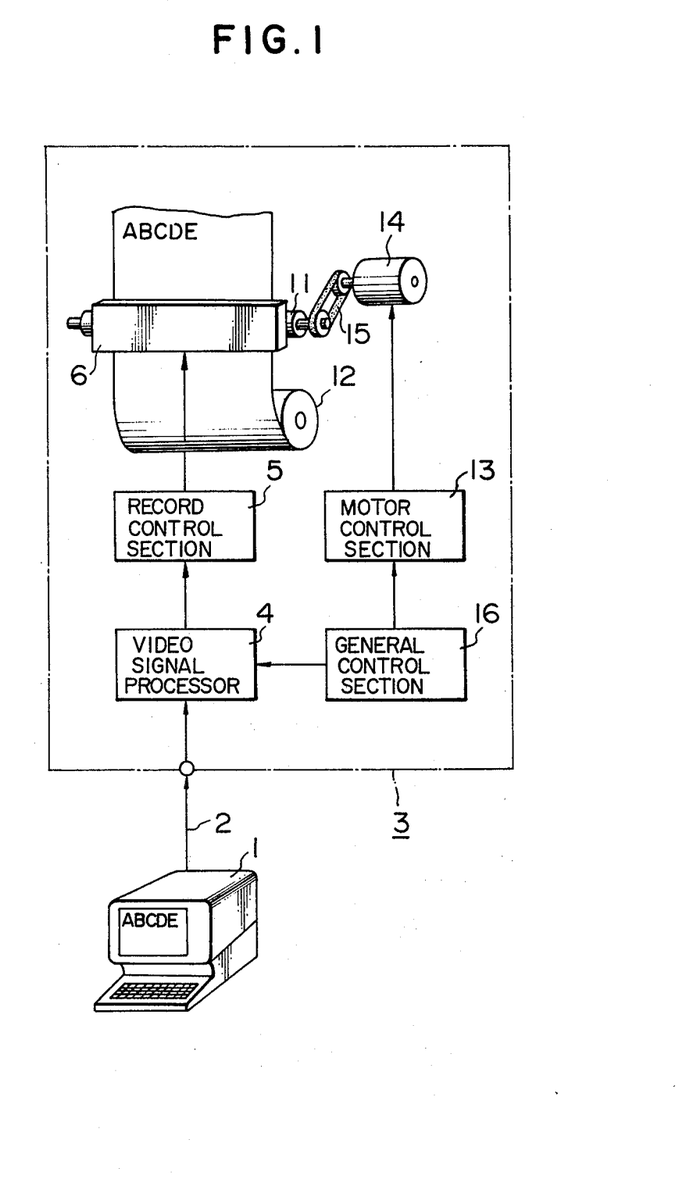
FIG. 1 is a block diagram of the basic construction of a heat sensitive type CRT hard copy apparatus of the invention.

Referring to FIG. 1, reference numeral 1 designates a CRT display used as a computer terminal unit, 2 a video signal from the CRT display, and 3 a CRT hard copy apparatus according to the invention. The CRT hard copy apparatus 3 comprises: a video signal processor 4 for sampling a line of a picture signal included in the video signal 2 at each field, temporarily storing it in a memory and then sending it as a record data at a speed suitable for recording; a record control section 5 for producing a record control signal in accordance with the record data; a record head 6 which is driven by the record control signal; a pulse motor 14 for feeding a recording paper 12 by one line through a paper feed roller 11 and a timing belt 15 every time one line recording has been finished; a motor control section 13; and a general control section 16 for controlling and monitoring the operation of the whole hard copy apparatus.

Figure 2:
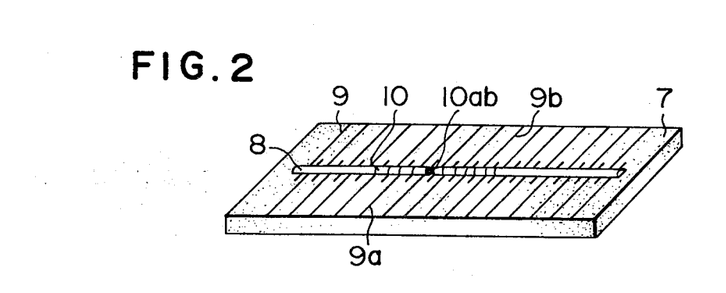
FIG. 2 is a perspective view of the detailed construction of the heat sensitive type record head in FIG. 1.

The record head 6 is a heat sensitive type record head which, as shown in FIG. 2, has a ceramic substrate 7, a thick film resistor 8 formed in a bar on the ceramic substrate 7, a conductor pattern group 9 printed on the ceramic substrate 7 to cross the thick film resistor 8, and a number of heat generating resistor group 10 formed as a result of sectioning by the conductor pattern group 9.

The recording paper 12 is a heat sensitive recording paper. Thus, when a current is supplied between adjacent conductor patterns 9a and 9b, a heat generating resistor 10ab (as indicated by the black area) between the conductors 9a and 9b is heated by the current so as to cause the color developing layer on the surface of the heat sensitive recording paper to be melt and produce a color, thereby achieving a recording on the recording paper. The record head has 512 dots, each of which corresponds to such a heat generating resistor 10ab.

Again referring to FIG. 1, the record control section 5 serves to selectively supply current to the heat generating resistor group 10 on the record head 6 in accordance with the record data fed from the video signal processor 4 so that one-dimensional dot pattern is formed on the heat sensitive recording paper 12 which is pressed against the heat generating resistor group surface by the roller 11. Every time one-line recording has been finished, the heat sensitive recording paper 12 is moved by the pitch of one line. Thus, the above operation is repeated to attain a hard copy of the CRT display picture on the recording paper 12.

Figure 3:
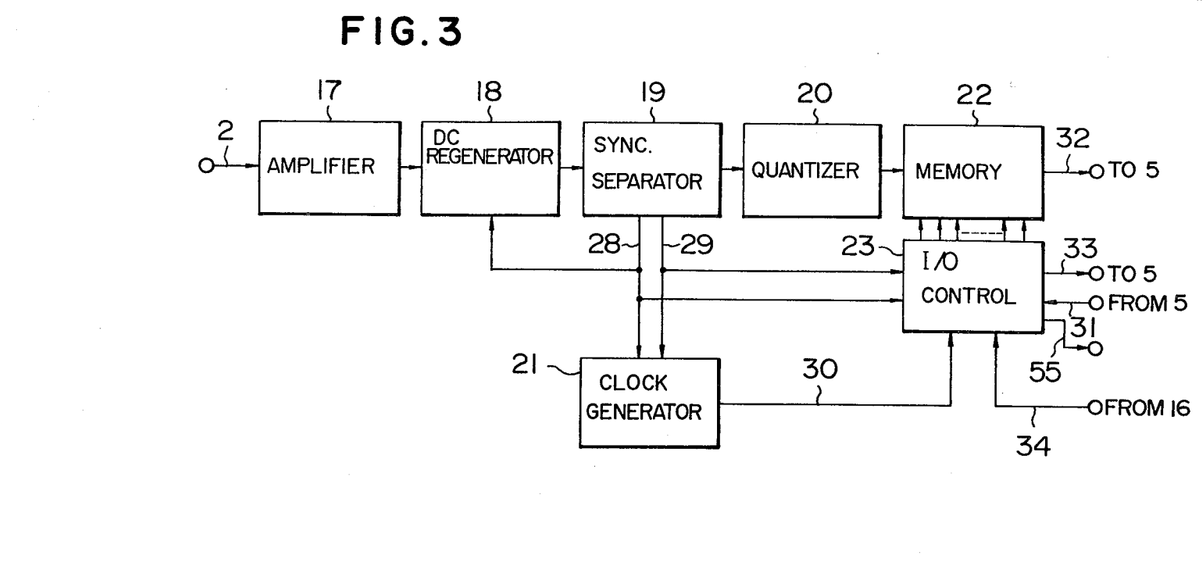
FIG. 3 is a detailed block diagram of one example of a conventional video signal processing unit.

FIG. 3 shows a conventional video signal processor. The video signal control processor, as shown in FIG. 3, includes an amplifier 17 for amplifying the incoming video signal 2 to a proper level, a DC regenerator 18 for correcting the DC component lost on the way to keep the signal level constant, a synchronizing separator 19 for separating a horizontal synchronizing signal 28 and a vertical synchronizing signal 29 from a video signal, a quantizer 20 for converting the picture component of a video signal to a binary value of a proper value, a clock pulse generator 21 for producing a clock pulse 30 which is synchronized in phase with the horizontal synchronizing signal 28, a memory 22, and an input/output control unit 23 for sampling and temporarily storing one-line picture signal at each field and sending the stored contents as a transfer data 32 together with a transfer clock pulse 33 to the record control section 5 every time a transfer data 31 is supplied from the record control section 5 to the input/output control unit 23. Shown at 34 is a record initiating signal from the general control 16, and 55 a record terminating signal.

Figure 5:
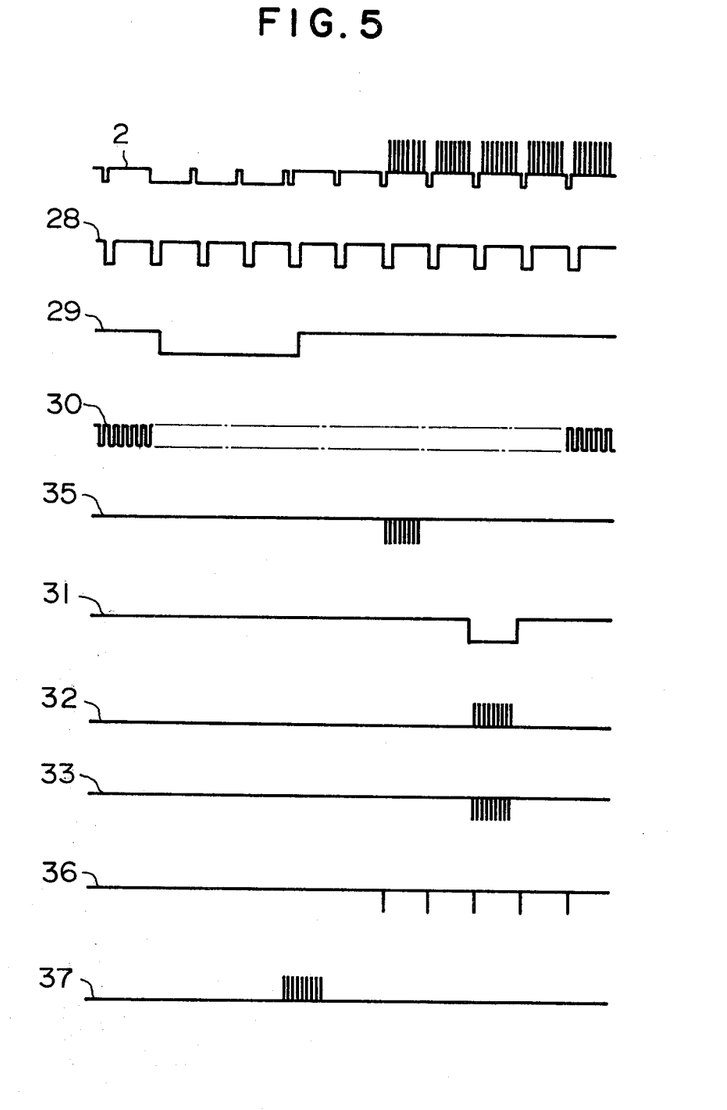
FIG. 5 is a waveform diagram useful for explaining the waveform of each signal in the video signal processing units in FIGS. 3 and 4.
Figure 8A:
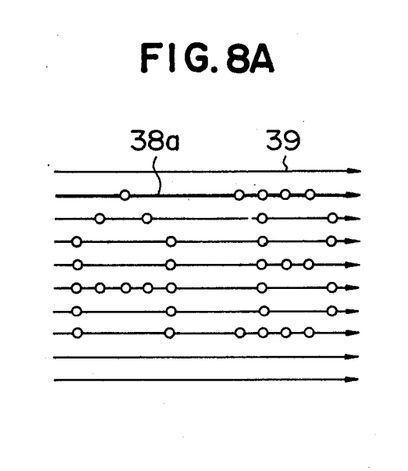
FIGS. 8A and 8B are explanatory diagrams showing a relationship between the horizontal sampling mode and the recording surface therewith.
Figure 8B:
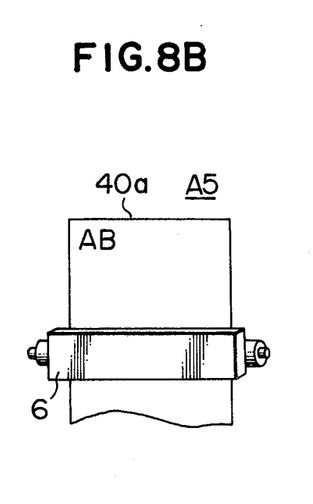

The input/output control unit 23 operates to sample a picture signal of one line in the horizontal direction at each field and write in the memory 22 such that a picture signal for each of 512 dots on one line is sampled in a specified horizontal scanning period as shown at 35 in FIG. 5. Therefore, in this case, the relation of the heat generating resistor arrangement on the record head 6 and a hard copy 40a is as shown in FIG. 8B. That is, when a line 38a to be sampled corresponds to the direction of a horizontal scanning line 39 of the CRT, the hard copy 40a is taken such that the printed picture is longitudinal, for example, A5size.

Figure 4:
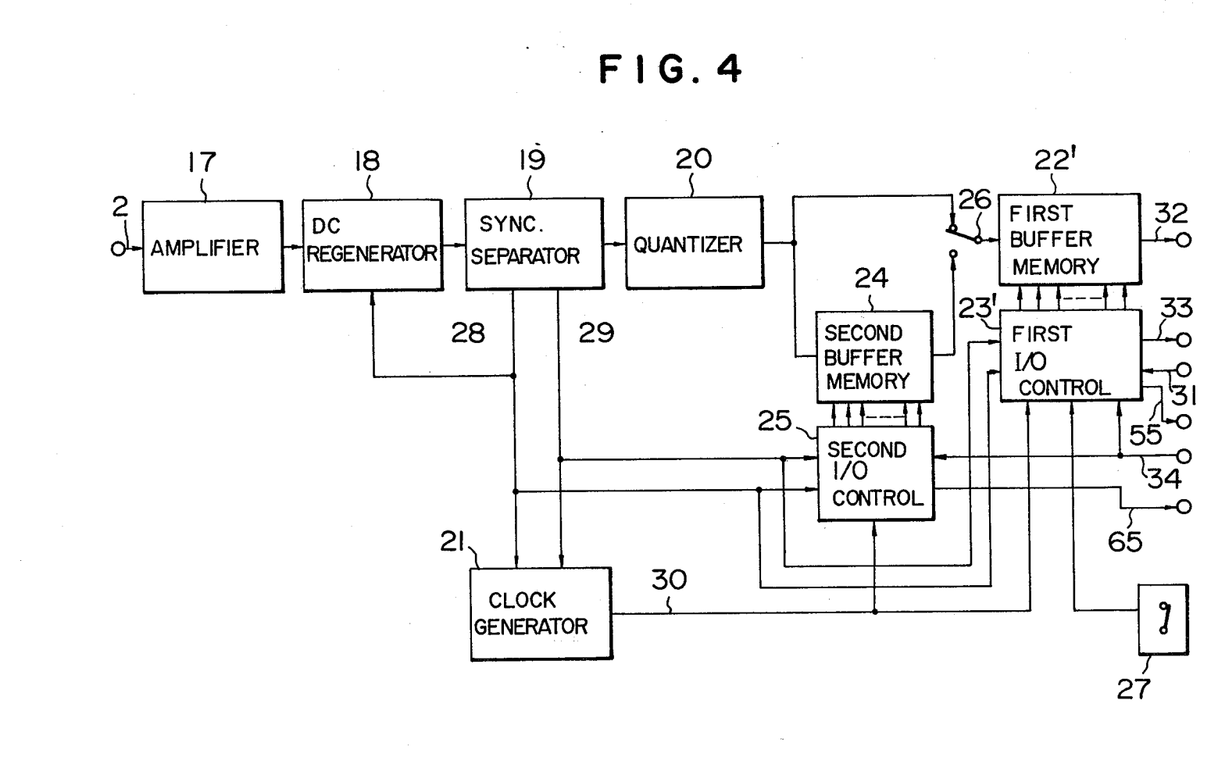
FIG. 4 is a detailed block diagram of a video signal processing unit relating to one embodiment of the invention.

FIG. 4 shows one embodiment of the video signal processor according to the present invention. Shown at 22' is a first buffer memory, and 23' a first input/output control unit, which have the same functions as those of the memory 22 and the input/output control unit 23 shown in FIG. 3, respectively. Shown at 24 is a second buffer memory, 25 a second input/output control unit, 26 and 27 first and second change-over switches, and 65 a record terminating signal.

The second input/output control unit 25 functions to sample a picture signal of one line in the vertical direction perpendicular to the horizontal scanning line, and write in the second buffer memory 24 such that a picture signal of one dot is sampled at a specified position in each horizontal scanning period as shown at 36 in FIG. 5. Since a video signal from the CRT display includes 256 horizontal scanning lines in each field, picture signals of 256 dots are sampled at each field. The data temporarily stored in the second buffer memory 24 is sent out in a specified horizontal scanning period as shown in FIG. 5 at 37, and the position or the vertical line at which the sampling is made in each of the horizontal scanning period is shifted by one dot each time the storing of one vertical line has been finished.

The first change-over switch 26 functions to selectively connect the input of the first buffer memory 22' to either of the outputs of the quantizer 20 and second buffer memory 24. The second change-over switch 27 functions to shift the write timing 35 to the first buffer memory 22' every time the recording of one horizontal line has been finished, or to make the write timing 35 be coincident with the read timing 37 of the second buffer memory 24.

Figure 9A:
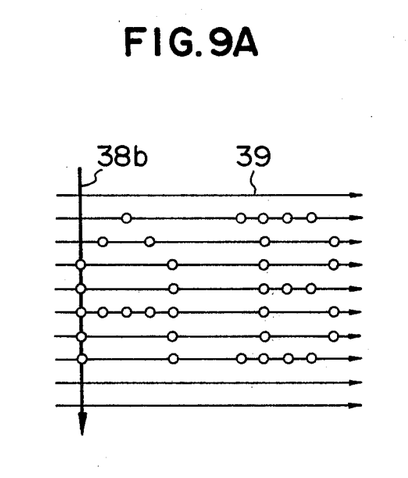
FIGS. 9A and 9B are explanatory diagrams showing a relationship between the vertical sampling mode and the recording surface therewith.
Figure 9B:
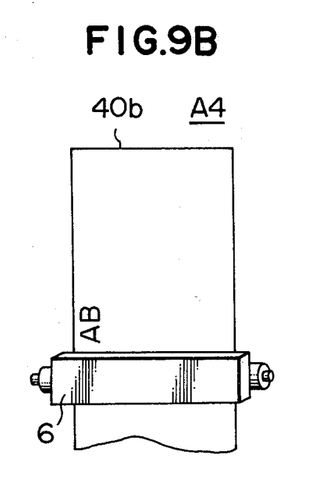

Therefore, if, by operating the first and second change-over switches 26 and 27 so that the output picture signal from the second buffer memory 24 is applied to the input of the first buffer memory 22' and the write timing 35 to the first buffer memory 22' is made coincident with the read timing 37 in the second buffer memory 24, the relation between the heat generating resistor arrangement on the record head 6 and a hard copy 40b is as shown in FIG. 9B. That is, when a line 38b (FIG. 9A) to be sampled is vertical to the horizontal scanning line 39 on the CRT, the hard copy 40b is in A4 size so that the printed picture becomes lateral.

Figure 6:
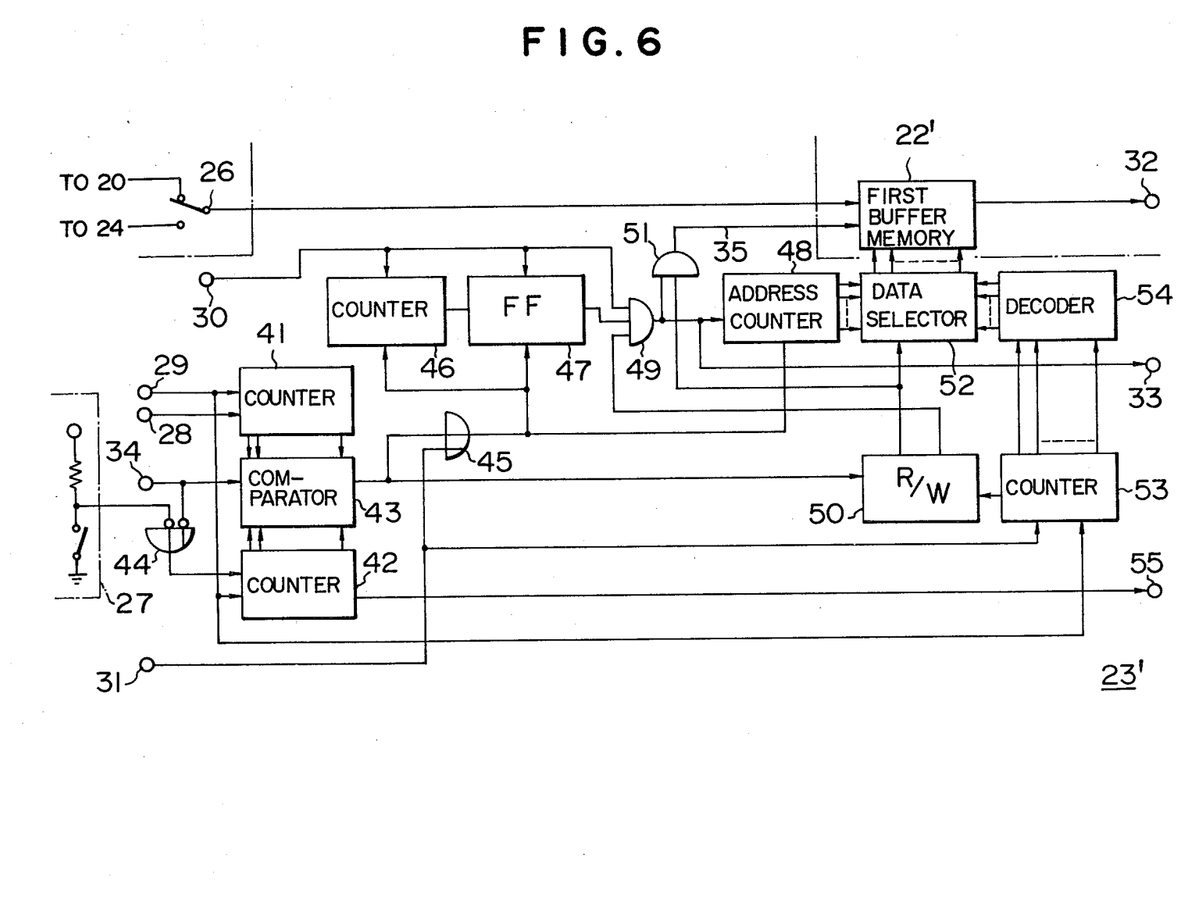
FIG. 6 is a detailed diagram of part of the blocks shown in FIG. 4.
Figure 7:
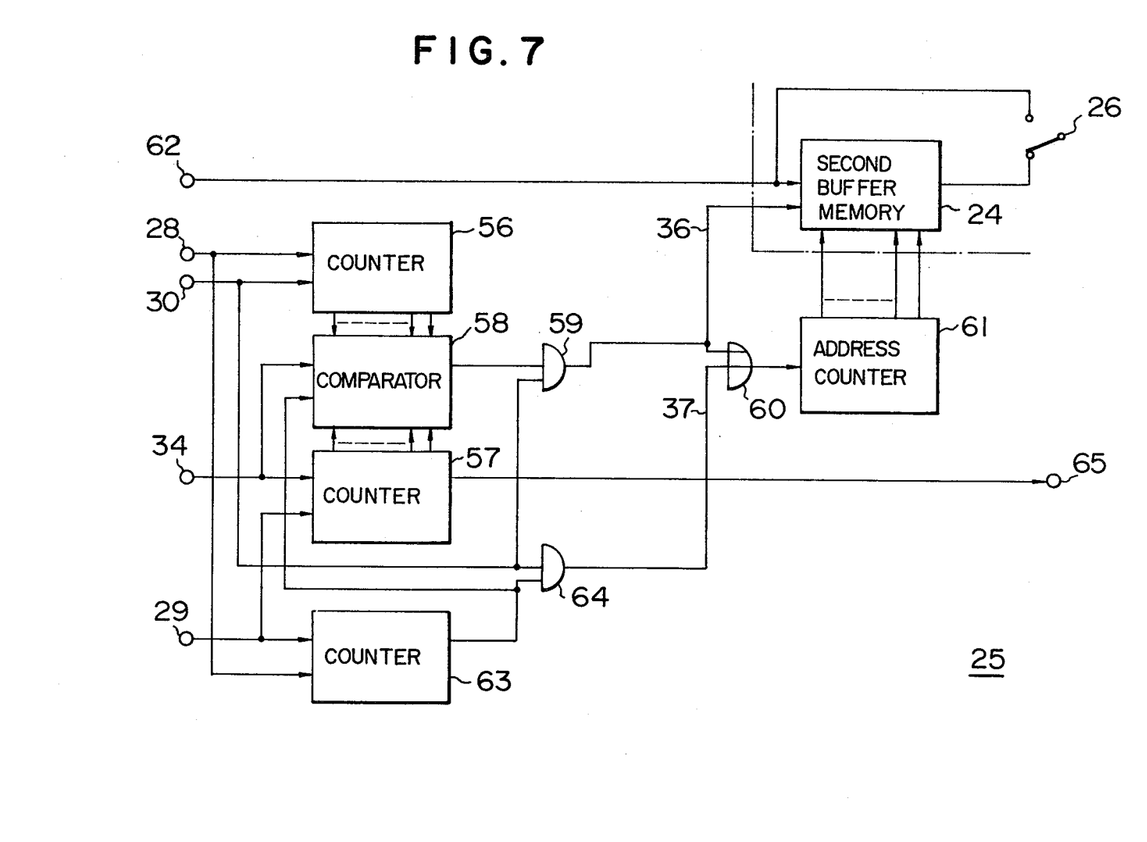
FIG. 7 is a detailed description of another part of the blocks shown in FIG. 4.

The sampling operation for picture signal will next be described with reference to FIGS. 6 and 7. FIG. 6 shows the arrangement of the first buffer memory 22', the first input/output control unit 23', and the first and second change-over switches 26 and 27, which has been shown in FIG. 4. When a picture signal is sampled in the horizontal scanning line direction, the first and second buffer memory 22' and 23' are operated but the second buffer memory 24 and the second input/output control unit 25 are not operated, by the switching operation of the first and second change-over switches.

In FIG. 6, there are shown a counter 41 for counting horizontal synchronizing signal and which is set to a constant value by a vertical synchronizing signal 29, a counter 42 for counting the vertical synchronizing signal 29 when sampling is made in the horizontal scanning direction, a comparator 43 for producing an output only when the record initiating signal 34 is supplied thereto and the contents of the counter 41 equals that of the counter 42, and a NAND gate 44 for fixing the count value of the counter 42 to a constant value when no record initiating signal 34 comes and when the change-over switch is at the low-level position to effect the sampling in the vertical direction, and for permitting the counter 42 to count when the change-over switch is at the high-level position to effect the sampling in the horizontal scanning direction. The accord signal from the comparator 43 corresponds to period of one horizontal scanning line of a picture signal, and is applied through an OR gate 45 to a counter 46, a flip-flop (F.F.) 47 and a counter 48. The counter 46 and F.F. 47 can operate only during the period of the accord signal. The counter 46 operates to count the clock pulse 30 and produce outputs twice during the time when the accord signal is being supplied thereto from the comparator 43. The F.F. 47 is reversed in its state upon the application of the first output from the counter 46 and reset by the second output therefrom. When the F.F. 47 is reversed in its state, the AND gate 49 supplies a constant number of clock pulses to an address counter 48 within a predetermined time. In this embodiment, the number of clock pulses which pass through the AND gate 49 upon the application of the reversed output from the F.F. 47 corresponds to the number of the sampling dots, or 512 dots per horizontal scanning line of a picture signal. The frequency of the clock 30 equals to that of the clock which forms the video signal on the CRT display. The output of the address counter 48 is supplied through a data selector 52 to the buffer memory 22'. The clocks passed through the counter 49 is applied to an AND gate 51 where it is permitted to pass the clocks therethrough when a write signal is supplied to the AND gate 51 from an input/output sequence control circuit 50. The clock 30 is thus applied as a write clock pulse 35 to the buffer memory 22'. Consequently, the information of 512 dots contained in one horizontal scanning line of a picture signal which comes through the first change-over switch is sampled and stored in the first buffer memory 22' by the application of the write clock pulse 35 thereto. The input/output sequence control circuit 50 performs switching of write/read mode and inhibiting of read mode when no data is present in the memory when data is written in the memory 22', the AND gate 49 opens even upon the application of the transfer timing signal 31, permitting a constant number of clock pulses to pass therethrough to the address counter 48, similar to the case of writing. At this time, the AND gate 51 is closed thus preventing writing in the memory 22. The data selector 52 selects a proper one of the outputs from the counter 48 and a decoder 54 and supplies it to the memory 22' as an address signal. Data for the one horizontal line is divided to four for transfer, and data of 128 dots is transferred at a time, and four times successive transfer of data corresponds to the transfer of one line of data. Therefore, each time the transfer timing signal 31 comes, a counter 53 counts up to switch the memory address for completing the transfer of one line data. The counter 53 is reset at each end of transfer of one line data, or by the vertical synchronizing signal 29. When sampling of one horizontal scanning line is completed within one field, the next vertical synchronizing signal causes the counter 42 to count up, and the comparator 43 selects the next horizontal scanning line, which is then sampled. When the counter 42 counts 256 vertical synchronizing signals corresponding to the number of all the horizontal scanning lines, the counter 42 produces the record terminating signal 55 which indicates completion of sampling of all the horizontal lines.

Description will be made of the case of scanning the CRT display in the vertical direction, or the mode of sampling in the vertical direction to the horizontal scanning lines of video signal. The first switch 26 is connected to the second buffer memory 24, and the second switch 27 is set to the position (low level side) at which the count value of the counter 42 is fixed to a constant value. FIG. 7 shows the circuit arrangement of the second buffer memory 24 and the second input/output control unit 25 as shown in FIG. 4. Referring to FIG. 7, numeral 56 represents a counter for counting the clock pulse 30, the count value of which is set to a constant value by the horizontal synchronizing signal 28. Reference numeral 57 denotes a counter which is set to a constant value when no record initiating signal 34 arrives and which counts the vertical synchronizing signal when the signal 34 comes, and 58 a comparator which produces an output only when the record initiating signal 34 comes and the contents of the counter 56 equals to those of the counter 57. If, for example, the counter 56 counts Nth pulse at the content of N of the counter 57, the comparator 58 produces an output, and therefore the output from the comparator 58 is the Nth clock in each horizontal scanning period in a field. This output thus indicates a particular position in all the horizontal scanning lines. An AND gate 59 supplies the clock pulse 30 as the write timing 36 for the memory 24 in the writing mode when the accord signal is applied from the comparator 58 to the AND gate 59. The clock pulse 30 is also supplied through an OR gate 60 to an address counter 61. Accordingly, a picture signal 62 is sampled dot by dot at a particular position on each line at each field. In this embodiment, 256 horizontal scanning lines are sampled, and thus 256 dots in the vertical direction are sampled at each field.

Shown at 63 is a counter which is set to a constant count value by the vertical synchronizing signal 29 and counts horizontal synchronizing signals. The counter 63 acts to open an AND gate 64 only when its content is a certain count value, and at this time, the clock pulse 30 is allowed to pass through the AND circuit 64 and sent as a read timing pulse 37 to the address counter 61. The address counter 61 acts to read successively the data of one vertical line which was written in the memory 24, and the read data are supplied to the change-over switch 26. Shown at 65 is a record terminating signal which is produced when all the vertical lines are scanned, for example, after 512 vertical lines have been sampled.

The sampled data read from the second buffer memory 24 is temporarily stored in the first buffer memory 22' by fixing the count value of the counter 42 by the change-over switch 27, and thereafter sent as the transfer data 32 to the record control unit 5.

In accordance with the embodiment, the first and second change-over switches 26 and 27 are properly operated to select either of the two different sampling modes as shown in FIGS. 8A, 8B, 9A and 9B, thereby enabling hard copies of different sizes to be taken.

While the heat sensitive type record system is used in the above embodiment, use may be made of, for example, a multistylus recording system, a discharge breakdown recording system, and a dry silver recording system instead of the heat sensitive type recording system.

As described above, the present invention is able to provide a CRT hard copy apparatus which can reasonably be applied to many CRT display devices. Moreover, since a record head with relatively few record elements can be used in the vertical sampling mode, the record head, a record-head drive circuit and a power supply for recording can be small sized and thus the copy apparatus can be constructed to be compact and manufactured at a low cost. Particularly, for the CRT hard copy apparatus such as of the heat sensitive type in which the record head and the drive section therefor are the main components, low cost and small size can be expected to a great extent.

What is claimed is:
1. A CRT hard copy apparatus for sampling a picture signal from a CRT display and recording the sampled signal on a recording paper, comprising:
  a first sampling means for sampling said picture signal in the horizontal scanning line direction to produce a first sampled signal;
  a second sampling means for sampling said picture signal in the vertical direction perpendicular to the horizontal scanning lines to produce a second sampled signal;

a switching means for selecting either of said first and second sampled signals;

a record control means for producing a record signal based on a selected sampled signal; and a record head for recording said sampled picture signal on said recording paper on the basis of said record signal.

2. A CRT hard copy apparatus according to claim 1, wherein said first sampling apparatus includes a first buffer memory for storing sampled information.

3. A CRT hard copy apparatus according to claim 1, wherein said second sampling means comprises a clock pulse counter which is set to a constant value by the horizontal synchronizing signal and counts a clock pulse, a vertical synchronizing counter for counting the vertical synchronizing signal, and a comparator for producing an output signal showing a particular position on each horizontal scanning line of a picture signal to be sampled, when the contents of both counters are equal to each other.

4. A CRT hard copy apparatus according to claim 1, wherein said record head is a heat sensitive type record head.

5. A CRT hard copy apparatus according to claim 1, wherein said first sampling means comprises a horizontal synchronizing signal counter which is set to a constant value by a vertical synchronizing signal and counts a horizontal synchronizing signal, a vertical synchronizing signal counter for counting a vertical synchronizing signal and a comparator for producing an output signal showing the horizontal scanning lines of a picture signal to be sampled, when the contents of both counters are coincident with each other.

6. A CRT hard copy apparatus according to claim 5, wherein said switching means includes a means for fixing to a constant value the count value of the vertical synchronizing signal counter of said first sampling means in order to select said second sampling signal.

7. A CRT hard copy apparatus according to claim 1, wherein said second sampling means includes a second buffer memory for storing sampled information.

8. A CRT hard copy apparatus according to claim 7, wherein said switching means includes a means for supplying the sampled information stored in said second buffer memory to the first buffer memory included in said first sampling means when said second sampling signal is selected.

* * * * *